United States Patent [19]

Wilhelm

[11] 3,723,554

[45] Mar. 27, 1973

[54] HYDROCARBON ISOMERIZATION PROCESS

[75] Inventor: Frederick C. Wilhelm, Arlington Heights, Ill.

[73] Assignee: Universal Oil Products Company, Des Plaines, Ill.

[22] Filed: Feb. 16, 1971

[21] Appl. No.: 115,699

Related U.S. Application Data

[60] Division of Ser. No. 852,463, Aug. 22, 1969, Pat. No. 3,630,961, which is a continuation-in-part of Ser. No. 835,218, June 20, 1969, abandoned.

[52] U.S. Cl.........260/668 A, 260/683.2, 260/683.68
[51] Int. Cl................................................C07c 5/24
[58] Field of Search...........260/668 A, 683.2, 683.68

[56] References Cited
UNITED STATES PATENTS 3,000,811    9/1961    Murray et al.........................208/138

Primary Examiner—Curtis R. Davis
Attorney—James R. Hoatson, Jr. and Robert W. Erickson

[57] ABSTRACT

A process for isomerizing isomerizable hydrocarbons, utilizing a catalytic composite comprising a combination of a platinum group component and a lead component uniformly distributed throughout a porous carrier material wherein the catalytic composite contains, on an elemental basis, about 0.01 to about 2 wt.% platinum group component and lead in an atomic ratio of lead to platinum group component of from about 0.05:1 to about 0.9:1, is disclosed.

18 Claims, No Drawings

HYDROCARBON ISOMERIZATION PROCESS

CROSS REFERENCE TO RELATED APPLICATION

This application is a division of my co-pending application Ser. No. 852,463, filed on Aug. 22, 1969, now U.S. Pat. No. 3,630,961 which copending application is a continuation-in-part of my co-pending application Ser. No. 835,218, filed on June 20, 1969, now abandoned all the teachings of both of which co-pending applications are incorporated herein by specific reference thereto.

BACKGROUND OF THE INVENTION

This invention relates to a process for isomerizing isomerizable hydrocarbons including isomerizable paraffins, cycloparaffins, olefins, and alkylaromatics. This process utilizes a catalytic composite which has exceptional activity, selectivity, and resistance to deactivation when employed in hydrocarbon isomerization processes that require catalysts having both a hydrogenation-dehydrogenation function and an acid cracking function. More precisely, the process of the present invention involves the utilization of a dual-function catalytic composite to isomerize isomerizable hydrocarbons, which catalyst employs, in combination with a platinum group component, an additional catalytic component, lead, which has traditionally been thought and taught to act as a poison for platinum group containing catalysts. This lead interacts with the platinum group component in the platinum group containing catalyst to afford substantial improvements in hydrocarbon isomerization processes of the type that have traditionally utilized platinum group metal containing catalysts. Specifically, the process of the present invention involves an isomerization process utilizing a catalytic composite comprising a combination of a platinum group component and a lead component with a porous, high surface area carrier material wherein these components are uniformly dispersed throughout the porous carrier material and wherein the amount of the platinum group component is greater than the amount of the lead component on an atomic ratio basis. More precisely, the process of the present invention involves the utilization of a dual-function catalytic composite having both a hydrogenation-dehydrogenation function and a cracking function which affords substantial improvements in hydrocarbon isomerization processes that have traditionally used dual-function catalysts.

Isomerization processes for the isomerization of hydrocarbons are important in the petrochemical and petroleum refining industries. The demand for the various xylene isomers, particularly para-xylene, has created a need for processes for isomerizing the other xylene isomers and ethylbenzene to produce the desired para-xylene. The need for branched chain paraffins such as isobutane and isopentane as intermediates in the production of high octane motor fuel alkylate can be met by isomerizing the corresponding normal paraffins. It is desired that the alkylate be highly branched to insure a high octane rating. This can be accomplished by alkylating iso-butane or isopentane with a $C_4$-$C_7$ internal olefin which can be produced by the isomerization of the corresponding linear alpha-olefin, shifting the double bond to a more centrally located position.

Catalytic composites exhibiting a dual hydrogenation-dehydrogenation function and a cracking function are widely used in the petroleum and petrochemical industry to isomerize isomerizable hydrocarbons. These catalysts are generally characterized as having a heavy metal component, such as metals or metallic compounds of Group V through VIII of the Periodic Table, particularly the Group VIII metals, to impart a hydrogenation-dehydrogenation function when associated with an acid-acting adsorptive, refractory inorganic oxide which imparts a cracking function. In these isomerization reactions, it is important that the catalytic composite not only catalyze the specific isomerization reactions involved with a minimum of side reactions by having its dual hydrogenation-dehydrogenation function correctly balanced against its cracking function, but, further, that the catalyst also be able to perform its desired function well over prolonged periods of time.

Performance of a given catalyst in a hydrocarbon isomerization process is typically measured by the activity, selectivity, and stability of the catalyst. Activity refers to the ability of the catalyst to isomerize the hydrocarbon reactants at a specified set of reaction conditions. Selectivity refers to the percent of the converted reactants isomerized to form the desired isomerized product or products. Stability refers to the rate of change of the selectivity and/or activity of the catalyst.

The principle cause of instability (i.e., loss of selectivity and activity in an originally selective, active catalyst) is the formation of coke on the surface of the catalyst during the course of the process. This coke may be characterized as a high molecular weight hydrogen-deficient carbonaceous material, typically having an atomic carbon to hydrogen ratio of about 1 or more. A major problem in hydrocarbon isomerization art is the development of a more active and selective catalyst that is not as sensitive to the presence of carbonaceous materials and/or has the ability to suppress the rate of the formation of these carbonaceous materials on the catalyst. One aim of the art is to develop a hydrocarbon isomerization process utilizing a dual-function catalyst having superior activity, selectivity, and stability. In particular, it is desired to have a hydrocarbon isomerization process wherein the isomerizable hydrocarbons are isomerized without excessive cracking or other decomposition reactions, which lower the yield of the process and make it more difficult and uneconomical to operate.

SUMMARY OF THE INVENTION

Accordingly, it is an object of this invention to provide a process for isomerizing isomerizable hydrocarbons. More specifically, it is an object of this invention to provide an isomerization process using a particular isomerization catalyst to isomerize isomerizable hydrocarbons without introducing undesired decomposition and/or cracking reactions. It is a further object of this invention to provide a process for isomerizing isomerizable hydrocarbons utilizing a dual-function catalyst having activity, selectivity, and stability superior to the catalysts previously available.

I have developed an isomerization process utilizing a dual-function catalyst which possesses improved activity, selectivity, and stability. In a $C_8$ alkylaromatic isomerization process, this catalyst produces essentially equilibrium conversion of $C_8$ alkylaromatics to a desired specific xylene isomer with essentially stoichiometric selectivity and without excessive production of hydrogenated or cracked products. The activity and selectivity are readily maintainable at the original high levels, making possible a stable catalytic alkylaromatic isomerization process. The catalytic composite, comprising a combination of a platinum group component and a lead component with a porous refractory carrier material, affords an improved hydrocarbon isomerization process utilizing a dual-function catalyst, provided the amounts of the components and the distribution thereof with the catalytic composite are carefully controlled in the manner hereinafter indicated. Since the introduction of isomerization processes utilizing platinum group-containing catalyst, it has been axiomatic that the effect of lead on this type of catalyst is detrimental. This concept has become so fixed and certain in the art that great effort has been devoted to removing lead contaminants from the various hydrocarbon charge stocks that are to be isomerized in units containing platinum group catalysts. The art is replete with methods available for reactivating platinum group-containing catalyst once they have been deactivated with lead or a compound of lead. In sharp contrast to this historic teaching in the art, I have discovered that the presence of lead in a platinum group catalytic composite is beneficial in hydrocarbon isomerization processes under certain specific conditions. One essential condition associated for obtaining a beneficial interaction of lead with platinum is that the atomic ratio of lead to platinum group metal in the composite be less than 1. Another condition for achieving a beneficial interaction of lead with platinum is that both the lead and platinum components be uniformly dispersed throughout the porous carrier material. A catalyst meeting both of these essential limitations differs sharply from lead contaminated catalysts of the prior art. The primary reason for this is that a lead contaminated catalyst inevitably possesses a high concentration of lead on the surface of the catalyst. This lead is acquired from contact with lead contaminated charge stock, and the atomic ratio of lead to platinum varies from unacceptably high amounts on the surface to negligably low amounts on the interior portion of the composite, resulting in lead contamination. The process of the present invention utilizes a catalytic composite wherein a controlled amount of a lead component is added to a dual function hydrocarbon isomerization catalyst containing a platinum group component so that this process is an improvement over the art.

In a broad embodiment, this invention relates to a process for isomerizing an isomerizable hydrocarbon which comprises contacting said hydrocarbon, at isomerization conditions, with a catalytic composite comprising a combination of a platinum group component and a lead component uniformly distributed throughout a porous carrier material wherein said composite contains, on an elemental basis, about 0.01 to about 2 wt. percent platinum group component and lead in an atomic ratio of lead to platinum group component of from about 0.05:1 to about 0.9:1. In a more limited embodiment, this catalytic composite contains about 0.1 to about 5 wt. percent halogen.

In a more specific embodiment, this invention relates to isomerization of either saturated or olefinic isomerizable hydrocarbons by contacting a hydrocarbon with the aforementioned catalytic composites at isomerization conditions which include a temperature of about 0°C. to about 500°C., a pressure of about atmospheric to about 200 atmospheres, and a liquid hourly space velocity of about 0.1 to about 10 hrs.$^{-1}$. In another limited embodiment, this process relates to the isomerization of an isomerizable alkyl-aromatic hydrocarbon by contacting the alkylaromatic with the aforementioned catalytic composites at isomerization conditions which include a temperature of about 0°C. to about 600°C., a pressure of about atmospheric to about 100 atmospheres, a liquid hourly space velocity of about 0.1 to about 20 hrs.$^{-1}$, and a hydrogen to hydrocarbon mole ratio of about 1:1 to about 20:1.

Other objects and embodiments of the invention will be found in the following detailed description of the process.

DESCRIPTION OF PREFERRED EMBODIMENTS

The process of this invention is applicable to the isomerization of isomerizable hydrocarbons including acyclic paraffins and cyclic naphthenes. It is particularly suitable for the isomerization of straight chain or mildly branched chain paraffins containing four or more carbon atoms per molecule such as normal butane, normal pentane, normal hexane, normal heptane, normal octane, etc., and mixtures thereof. Cycloparaffins to which this process is applicable are those containing at least about five carbon atoms in the ring, e.g., alkylcyclopentanes and cyclohexanes, and including methylcyclopentane, dimethylcyclopentane, cyclohexane, methylcyclohexane, dimethylcyclohexane, etc. This process is also suitable for the conversion of mixtures of paraffins and/or naphthenes such as those derived by fractionation and distillation of straight-run natural gasolines and naphthas. Such mixtures of paraffins and/or naphthenes include the so-called pentane fractions, hexane fractions, and mixtures thereof. It is not intended to limit this invention to the enumerated saturated hydrocarbons. It is contemplated that straight or branched chain saturated hydrocarbon containing up to about 25 carbon atoms per molecule, such as those contained in jet fuels, etc. may be isomerized utilizing the process of the present invention. $C_4$–$C_9$ hydrocarbons are particularly preferred.

The olefins which may be isomerized in this process may be a mixture of olefinic hydrocarbons of approximately the same molecular weight, including the 1-isomer, 2-isomer, and other position isomers, which may be isomerized to an olefin in which the double bond occupies a more centrally located position in the hydrocarbon chain. The process of this invention can be used to provide an olefinic feedstock for motor fuel alkylate production containing the desired isomers, having more centrally located double bonds by converting the 1-isomer, or other near-terminal-position olefins to olefins wherein the double bond is more centrally located in the carbon atoms chain. The process of this invention is thus applicable to the isomerization of isomerizable olefinic hydrocarbons such as the isomerization of 1-butene to 2-butene or the isomerization of the 3-methyl-1-butene to 2-methyl-2-butene. Also, the process of this invention can be utilized to shift the double bond of an olefinic hydrocarbon such as 1-pentene, 1-hexane, 2-hexane, and 4-methyl-1-pentene to a more centrally located position so that 2-pentene, 2-hexene, 3-hexene and 4-methyl-2-pentene, respectively, can be obtained. It is not intended to limit this invention to the olefinic hydrocarbons enumerated. It is contemplated that shifting a double bond to a more centrally located position may be effected in straight or branched chain olefinic hydrocarbons containing up to about 20 carbon atoms per molecule. Nor is it intended to limit the scope of this invention to isomerization processes wherein only the olefinic bond is isomerized to a new position. This process is suitable for use where the skeletal arrangement of the hydrocarbon is also changed, for example in the isomerization of 1-pentene to 3-methyl-1-butene and/or 2-methyl-2-butene. Particularly preferred are the $C_4$-$C_7$ isomerizable olefins. The process of this invention can also be applied to the hydroisomerization of olefins wherein olefins are converted to branched chain paraffins and/or branched olefins.

The process of this invention is also applicable to the isomerization of isomerizable alkylaromatic hydrocarbons including ortho-xylene, meta-xylene, para-xylene, ethylbenzene, the ethyltoluenes, the trimethylbenzenes, the diethylbenzenes, the triethylbenzenes, normal propylbenzene, isopropylbenzene, etc., and mixtures thereof. Preferred isomerizable alkylaromatic hydrocarbons are the monocyclic alkylaromatic hydrocarbons, i.e., the alkylbenzene hydrocarbons, particularly the $C_8$ alkylbenzenes and non-equilibrium mixtures of various $C_8$ aromatic isomers. Higher molecular weight alkylaromatic hydrocarbons such as the alkylnaphthalenes, the alkylanthracenes, etc., are also suitable.

The isomerizable hydrocarbons utilized may be derived as selective fractions from various petroleum streams, for example as individual components or as certain boiling range fractions obtained by the selective fractionation and distillation of catalytically cracked gas oil. The process of this invention may be utilized for conversion of isomerizable hydrocarbons when these isomerizable hydrocarbons are present in minor quantities in various fluid or gaseous streams. The isomerizable hydrocarbons to be used in the process of this invention need not be concentrated. For example, isomerizable hydrocarbons appear in minor quantities in various refinery offstreams, usually diluted with gases such as hydrogen, nitrogen, methane, ethane, propane, etc. These streams contain minor quantities of isomerizable hydrocarbons and are found in various petroleum refinery installations including thermal cracking units, catalytic cracking units, thermal reforming units, coking units, polymerization units, dehydrogenation units, etc. Such refinery offstreams have been burned as fuel because an economical process for their utilization has not been available. This is particularly true for refinery fluid streams containing minor quantities of isomerizable hydrocarbons. This process is capable of isomerizing aromatic streams, such as reformate, to produce xylenes, particularly para-xylene, upgrading reformate to a high petrochemical value.

The catalyst to be utilized in the process of the present invention comprises a porous carrier material or support having combined therewith a platinum group component, a lead component and, in a preferred embodiment, a halogen component. It is preferred that the carrier material be a porous, adsorptive, high surface area support having a surface area of about 25 to about 500 $m^2/gm$. The porous carrier material should be relatively refractory to the conditions utilized in the hydrocarbon isomerization process. It is intended to include within the scope of the process carrier materials which have traditionally been utilized in dual-function hydrocarbon conversion catalysts, for example: (1) activated carbon, coke, or charcoal; (2) silica or silica gel, clays and silicates including those synthetically prepared and naturally occurring, which may or may not be acid treated; for example, Attapulgus clay, china clay, diatomaceous earth, fuller's earth, kaolin, kieselguhr, pumice, etc.; (3) ceramics, porcelain, crushed firebrick, and bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) crystalline aluminosilicates such as naturally occurring or synthetically prepared mordenite and/or faujasite, either in the hydrogen form or in a form which has been treated with multi-valent cations; and, (6) combinations of these groups. The porous carrier materials preferred for use in the process are refractory inorganic oxides, and best results are obtained with an alumina carrier material. Suitable alumina materials are the crystalline aluminas known as gamma-, eta-, and theta-alumina. Gamma- and eta-alumina give best results. In some embodiments the alumina carrier material may contain minor proportions of other refractory inorganic oxides such as silica, zirconia, magnesia, etc.; however, the preferred carrier material is substantially pure gamma- or eta-alumina. Preferred carrier materials have an apparent bulk density of about 0.30 to about 0.70 gm/cc and surface area characteristics such that the average pore diameter is about 20 to 300 Angstroms, the pore volume is about 0.10 to about 1.0 ml/gm and the surface area is about 100 to about 500 $m^2/gm$. In general, best results are obtained with a gamma-alumina carrier material in the form of spherical particles having a relatively small diameter (i.e., about one-sixteenth inch), an apparent bulk density of about 0.5 gm/cc, a pore volume of about 0.4 ml/gm, and a surface area of about 175 $m^2/gm$.

The preferred alumina carrier material may be prepared in any suitable manner and may be synthetically prepared or natural occurring. Whatever type of alumina is employed may be activated prior to use by one or more treatments including drying, calcination, steaming, etc., and may be in a form known as activated alumina, activated alumina of commerce, porous alumina, alumina gel, etc. For example, the alumina carrier may be prepared by adding a suitable alkaline reagent, such as ammonium hydroxide, to a salt of aluminum such as aluminum chloride, aluminum nitrate, etc., in an amount to form an aluminum hydroxide gel which upon drying and calcining is converted to alumina. The alumina may be formed in any desired shape such as spheres, pills, cakes, extrudates, powders, granules, etc., and utilized in any desired size. For the purpose of the present invention, a particularly preferred form of alumina is the sphere. Alumina spheres may be continuously manufactured by the well known oil drop method. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300°F. to about 400°F. and subjected to a calcination procedure at a temperature of about 850°F. to about 1,300°F. for a period of about 1 to about 20 hours. This treatment effects conversion of the alumina hydrogel to the corresponding crystalline gamma-alumina. See the teachings of U. S. Pat. No. 2,620,314 for additional details.

One essential constituent of the catalytic composite to be utilized in the process of the present invention is a lead component. This component may be present in the composite as an elemental metal or as a chemical compound such as the oxide, sulfide, halide, oxychloride, aluminate, etc. Although it is not intended to restrict the present invention by the following explanation, it is believed that best results are obtained when the lead component is present in the composite in an oxidation state above that of the elemental metal, that is, when the lead component exists in the catalytic composite in the +2 oxidation state. The preferred method of preparation of the catalytic composite of the present invention is believed to result in the composite containing the lead component in an oxidation state above that of the elemental metal. The lead component may be incorporated into the catalytic composite in any manner known to effectively disperse this component throughout the carrier material or to result in this condition. The incorporation may be effected by coprecipitation or cogellation with the porous carrier material, ion-exchange with the carrier material while it is in a gel state, or impregnation of the carrier material at any stage in its preparation. It is to be noted that it is intended to include within the scope of the incorporation all conventional methods for incorporating a metallic component in a catalyst composite which result in a uniform distribution of the metallic component throughout the associated carrier material. One preferred method of incorporating the lead component to the catalytic composite involves coprecipitating the lead component during the preparation of the preferred refractory oxide carrier material. Typically, this involves adding a suitable, soluble, decomposable lead compound to the alumina hydrosol, combining the hydrosol with a suitable gelling agent, and dropping the resulting mixture into an oil bath. After drying and calcining the resulting gelled carrier material, there is obtained an intimate combination of alumina and lead oxide, which combination has the lead component uniformly dispersed throughout the alumina. Another preferred method of incorporating the lead component into the catalytic composite involves the utilization of soluble, decomposable compound of lead to impregnate the porous carrier material. In general, the solvent used in this preferred impregnation step is selected on the basis of its ability to dissolve the desired lead compound and is typically an aqueous solution. The lead component may be added to the carrier material by commingling the latter with an aqueous solution of a suitable lead salt or water-soluble compound of lead such as lead acetate, lead basic acetate, lead bromate, lead bromide, lead chlorate, lead perchlorate, lead chloride, lead citrate, lead ethylsulfate, lead formate, lead nitrate, lead basic nitrate, lead nitrite, and the like compounds. Best results are ordinarily obtained with a solution of lead nitrate and nitric acid. In general, the lead component can be impregnated either prior to, simultaneously with, or after the platinum group metallic component is added to the carrier material. I have obtained excellent results by impregnating the lead component simultaneously with the platinum group component.

A preferred impregnation solution contains chloroplatinic acid, nitric acid, and lead nitrate. Following the impregnation step, the resulting composite is dried and calcined as explained hereinafter.

Regardless of which lead compound is used in the preferred impregnation step, it is important that the lead component be uniformly distributed throughout the carrier material. It is therefore necessary to maintain the pH of the impregnation solution in a range of about 1 to about 7 and to dilute the solution to a volume which is substantially in excess of the volume of the carrier material which is impregnated. It is preferable to use a volume ratio of impregnation solution to carrier material of at least 1.5:1 to about 2:1 to about 3:1 or more. Similarly, a relatively long contact time should be used during this impregnation step ranging from about 0.25 hours up to about 0.5 hours or more. The carrier material is also preferably constantly agitated during this impregnation step.

As indicated, the catalyst to be utilized in the process of the present invention contains a platinum group component. Although this process is specifically directed to the use of a catalytic composite containing platinum, it is intended to include other platinum group metals such as rhodium, ruthenium, osmium, iridium, and particularly palladium. The platinum group component may exist within the final catalytic composite as an oxide, sulfide, halide, etc., or as an elemental metal. Generally, the amount of the platinum group component present in the final catalyst composite is small compared to the quantities of the other components. In fact, the platinum group component generally comprises about 0.01 to about 2.0 wt. percent of the final catalytic composite, calculated on an elemental basis. Excellent results are obtained when the catalyst contains about 0.05 to about 1.0 wt. percent of the platinum group metal. The preferred platinum group component is platinum or palladium or a compound of platinum or palladium.

The platinum group component may be incorporated in the catalytic composite in any suitable manner, for instance by coprecipitation or cogellation with the preferred carrier material, or by ion-exchange or impregnation thereof. The preferred method for preparing the catalyst is the utilization of a water-soluble, decomposable compound of a platinum group metal to impregnate the carrier material. The platinum group component may be added to the carrier by commingling the latter with an aqueous solution of chloroplatinic acid. Other water-soluble compounds of platinum may be employed in impregnation solutions and include ammonium chloroplatinate, bromoplatinic acid, platinum dichloride, platinum tetrachloride hydrate, platinum dichlorocarbonyldichloride, dinitrodiaminoplatinum, etc. The utilization of a platinum chloride compound such as chloroplatinic acid is preferred since it facilitates the incorporation of both the platinum component and at least a minor quantity of the preferred halogen component in a single step. Hydrogen chloride or nitric acid is also generally added to the impregnation solution in order to facilitate the incorporation of the halogen component and to aid in the distribution of the metallic component throughout the carrier material. It is generally preferred to impregnate the carrier material after it has been calcined in order to minimize the risk of washing away the valuable platinum group metal compounds; however, in some cases it may be advantageous to impregnate the carrier material when it is in a gelled state. Following the impregnation, the resulting impregnated support is dried and subjected to high temperature calcination or oxidation.

A preferred constituent of the composite to be utilized in the process of this invention is a halogen component. Although the precise form of the chemistry of the association of the halogen component with the carrier material is not entirely known, it is customary in the art to refer to the halogen component as being combined with the carrier material or with the other ingredients of the catalyst. The combined halogen may be fluorine, chlorine, iodine, bromine, or mixtures thereof. Of these, fluorine, and chlorine are preferred and yield superior results. The halogen may be added to the carrier material in any suitable manner either during preparation of the carrier material or before or after the addition of the other components. For example the halogen may be added at any stage of the preparation of the carrier material or added to the calcined carrier material as an aqueous solution of an acid such as hydrogen fluoride, hydrogen chloride, hydrogen bromide, etc. The halogen component or a portion thereof may be composited with the carrier material during the impregnation of the latter with the platinum group component, for example, by utilizing a mixture of chloroplatinic acid and hydrogen chloride. In another situation, the alumina hydrosol which is typically utilized to form the preferred alumina carrier material may contain halogen and thus contribute at least a portion of the halogen component to the final composite. The halogen is combined with the carrier material in an amount sufficient to result in a final composite that contains about 0.1 to about 15 wt. percent and preferably about 0.1 to about 5 wt. percent halogen, calculated on an elemental basis. The exact amount of halogen depends on the activity desired and/or the hydrocarbon to be isomerized. In general, it is preferred to have lesser amounts of halogen present when utilizing the catalyst to isomerize olefins, and larger amounts are preferred when the catalyst is used to isomerize paraffins or alkylaromatics. In particular, about 0.1 to about 1 wt. percent halogen is sufficient for olefin isomerization processes and about 0.2 to about 3 wt. percent chlorine and/or about 0.5 to about 5 wt. percent fluorine are desired for paraffinic and alkylaromatic isomerization processes.

I have observed that the beneficial interaction of the lead component with the platinum group component is only obtained when the lead component is present, on an atomic basis, in an amount substantially less than the platinum group component. Quantitatively, the amount of the lead component is preferably sufficient to provide an atomic ratio of lead to platinum group metal of about 0.05:1 to about 0.9:1. Best results are obtained at an atomic ratio of about 0.1:1 to about 0.75:1. The criticalness of this atomic ratio limitation is apparent when isomerization of hydrocarbons with a catalyst having an atomic ratio of lead to platinum of 1:1 is attempted. In this case, I observed substantial deactivation of the platinum component by the lead component. It is an essential feature of the process of the present invention that the amount of the lead component be chosen as a function of the amount of the platinum group component in order to insure that the atomic ratio of these components in the resulting catalyst is within the stated range. Specific examples of especially preferred catalytic composites to be utilized in the process of this invention are as follows: (1) a catalytic composite comprising 1.0 wt. percent platinum, 0.5 wt. percent lead, and 0.1 to 5 wt. percent halogen combined with an alumina carrier material, (2) a catalytic composite comprising 0.75 wt. percent platinum, 0.2 wt. percent lead, and 0.1 to 5 wt. percent halogen combined with an alumina carrier material, (3) a catalytic composite comprising 0.375 wt. percent platinum, 0.10 wt. percent lead, and 0.1 to 5 wt. percent halogen combined with an alumina carrier material, (4) a catalytic composite comprising 0.2 wt. percent platinum, 0.1 wt. percent lead, and 0.1 to 5 wt. percent halogen combined with an alumina carrier material, and, (5) a catalytic composite comprising 0.5 wt. percent platinum, 0.2 wt. percent lead, and 0.1 to 5 wt. percent halogen combined with an alumina carrier material.

Regardless of the details of how the components of the catalyst are combined with the porous carrier material, the final catalyst generally is dried at a temperature of about 200° to about 600°F. for a period of from about 2 to about 24 hours or more, and finally calcined at a temperature of about 700°F. to about 1100°F. in an air atmosphere for a period of about 0.5 to about 10 hours in order to convert the metallic components substantially to the oxide form. Best results are generally obtained when the halogen content of the catalyst is adjusted during the calcination step by including a halogen or a halogen-containing compound in the air atmosphere utilized. When the halogen component of the catalyst is chlorine, it is preferred to use a mole ratio of $H_2O$ to HCl of about 20:1 to about 100:1 during at least a portion of the calcination step in order to adjust the final chlorine content of the catalyst to the preferred range of about 0.1 to about 3 wt. percent.

Although it is not essential, the resulting calcined catalytic composite can be impregnated with an anhydrous Friedel-Crafts type metal halide, such as aluminum chloride. Other suitable metal halides are aluminum bromide, ferric chloride, ferric bromide, zinc chloride, beryllium chloride, etc. It is preferred that the porous carrier material be a refractory inorganic oxide containing chemically combined hydroxyl groups such as those contained in silica and any of the other aforementioned refractory inorganic oxides including the various crystalline aluminosilicates and clays. Particularly preferred is alumina.

The presence of chemically combined hydroxyl group in the porous carrier material allows a reaction to occur between the Friedel-Crafts metal halide and the hydroxyl groups of the carrier material. For example, aluminum chloride reacts with the hydroxyl groups of alumina to yield Al-O-AlCl$_2$ active centers which enhance the catalytic behavior of the original platinum-lead-alumina-halogen composite, particularly for isomerizing C$_4$-C$_9$ paraffins. The combined halogen content presently within the calcined composite should be within the lower portion of the 0.1 to 15 wt. percent halogen range. This combined halogen substitutes to some degree for the hydroxyl groups which are necessary for the reaction with the Friedel-Crafts metal halide.

The Friedel-Crafts metal halide can be impregnated onto the calcined catalytic composite containing combined hydroxyl groups by the sublimation of the halide onto the lead-platinum composite under conditions such that the sublimed metal halide is combined with the hydroxyl groups of the composite. This reaction is typically accompanied by the elimination of about 0.5 to about 2.0 moles of hydrogen chloride per mole of Friedel-Crafts metal halide reacted. For example, in subliming aluminum chloride, which sublimes at about 184°C., suitable impregnation temperatures range from about 190°C. to about 700°C., preferably from about 200°C. to about 600°C. The sublimation can be conducted at atmospheric pressure or under increased pressure and in the presence of diluents such as inert gases, hydrogen, and/or light paraffinic hydrocarbons. This impregnation may be conducted in a batch process but a preferred method is to pass sublimed AlCl$_3$ vapors in admixture with an inert gas such as hydrogen through a calcined catalyst bed. This method both continuously deposits the aluminum chloride and removes the evolved HCl.

The amount of metal halide combined with the lead-platinum composite may range from about 1 percent to about 100 percent of the original metal halide-free composite. The final composite has unreacted metal halide removed by treating the composite at a temperature above the sublimation temperature of the halide for a time sufficient to remove therefrom any unreacted metal halide. For AlCl$_3$, temperatures of about 400°C. to about 600°C. and times of from about 1 to about 48 hours are sufficient.

It is preferred that the resultant calcined catalytic composite be subjected to a substantially water-free reduction step prior to its use in the conversion of hydrocarbons. This step is designed to insure a uniform and finely divided dispersion of the metallic component throughout the carrier material. Preferably, substantially pure and dry hydrogen (i.e., less than 20 vol. ppm. H$_2$O) is used as the reducing agent in this step. The reducing agent is contacted with the calcined catalyst at conditions, including a temperature of about 800°F. to about 1,000°F., selected to reduce the platinum group component to the metallic state. This reduction step may be performed in situ as part of a start-up sequence if precautions are taken to predry the plant to a substantially water-free state and if substantially water-free hydrogen is used.

The resulting reduced catalytic composite may, in some cases, be beneficially subjected to a presulfiding step designed to incorporate in the catalytic composite from about 0.05 to about 0.50 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50°F. up to about 1,000°F. It is generally a good practice to perform this presulfiding step under substantially water-free conditions.

According to the process of the present invention, a hydrocarbon charge stock and hydrogen are contacted with a catalyst of the type described above in a hydrocarbon isomerization zone. This contacting may be accomplished by using the catalyst in a fixed bed system, a moving bed system, a fluidized bed system, or in a batch type operation; however, due to possible attrition losses and well-known operational advantages, it is preferred to use a fixed bed system. In this system, a hydrogen-rich gas and the charge stock are preheated by suitable heating means to the desired reaction temperature and are then passed into a conversion zone containing a fixed bed of the catalyst type previously characterized. The conversion zone may be one or more separate reactors with suitable means to insure that the desired conversion temperature is maintained at the entrance to each reactor. It is also to be noted that the reactants may be contacted with the catalyst bed in either upward, downward, or radial flow. It is to be noted that the reactants may be in a liquid-vapor phase, or a vapor phase when they contact the catalyst. Best results are obtained in the vapor phase.

The process of this invention, is preferably effected in a continuous, downflow, fixed-bed system. In one particular method the hydrocarbon is continuously passed, preferably commingled with about 0.1 to about 10 moles or more of hydrogen per mole of hydrocarbon, to an isomerization reaction zone containing the catalyst and the zone is maintained at proper isomerization conditions including a temperature in the range of about 0°C. to about 500°C., or more preferably 0°C. to 425°C., and a pressure of about atmospheric to about 200 atmospheres or more preferably 10 to 100 atmospheres. The hydrocarbon is passed over the catalyst at a liquid hourly space velocity (defined as volume of liquid hydrocarbon passed per hour per volume of catalyst) of from about 0.1 to about 10 hr.$^{-1}$ or more. Diluents such as argon, nitrogen, etc., may be present. The reactor effluent is continuously withdrawn, and the isomerized product is separated from the reactor effluent and recovered by conventional means, preferably fractional distillation, while the unreacted starting material may be recycled to form a portion of the feed stock.

The process of this invention for isomerizing an isomerizable alkylaromatic hydrocarbon is preferably effected by contacting the aromatic in a reaction zone containing the described catalyst in a fixed bed by passing the hydrocarbon in a downflow fashion through the bed while maintaining the zone at proper alkylaromatic isomerization conditions including a temperature in the range of from about 0°C. to about 600°C., or more, and a pressure of one atmosphere to about 100 atmospheres or more. The hydrocarbon is passed preferably in admixture with hydrogen at a hydrogen to hydrocarbon mole ratio of about 1:1 to about 25:1 or more at a liquid hourly hydrocarbon space velocity of about 0.1 to about 20 hr.−1 or more. Other inert diluents such as nitrogen, argon, etc., may be present. The reactor effluent is continuously withdrawn, and the isomerized product is separated by conventional means such as fractional distillation or crystallization and recovered.

EXAMPLES

The following examples are given to illustrate the process of the present invention in the isomerization of isomerizable hydrocarbons. However, these examples are not presented for purposes of limiting the scope of the invention but in order to further illustrate the embodiments of the present process.

EXAMPLE I

The catalytic composite utilized in this example was produced as follows: An alumina carrier material comprising 1/16 inch alumina spheres was prepared by forming an alumina hydroxyl chloride sol by dissolving substantially pure aluminum pellets in a hydrochloric acid solution, adding hexamethylenetetramine to the resulting sol, gelling the resulting solution by dropping it into an oil bath to form spherical particles of an aluminum hydrogel, aging and washing the resulting particles with an ammoniacal solution and finally drying and calcining the aged and washed particles to form spherical particles of gamma- alumina containing about 0.3 wt. percent combined chloride. Additional details as to this method of preparing the preferred carrier material are given in the teachings of U. S. Pat. No. 2,620,314.

The resulting gamma-alumina particles were then contacted with an impregnation solution containing chloroplatinic acid and lead nitrate in an amount sufficient to result in a final composite containing 0.375 wt. percent platinum and 0.1 wt. percent lead, calculated on an elemental basis. In addition, the impregnation solution contained nitric acid in an amount equivalent to about 3 wt. percent of the alumina particles. In order to insure uniform distribution of both metallic components throughout the carrier material, this impregnation step was performed by adding the carrier material particles to the impregnation mixture with constant agitation. In addition, the volume of the solution was two times the volume of the carrier material particles. The impregnation mixture was maintained in contact with the carrier material particles for a period of about one-half hour at a temperature of about 70°F. Thereafter, the temperature of the impregnation mixture was raised to about 225°F. and the excess solution was evaporated in a period of about 1 hour. The resulting dried particles were then subjected to a calcination treatment in an air atmosphere at a temperature of about 925°F. for about 1 hour. The calcined spheres were then contacted with an air stream containing $H_2O$ and HCl in a mole ratio of about 40:1 for about 4 hours at 975°F. in order to adjust the halogen content of the catalyst particles to a value of about 0.90.

The resulting catalyst particles were analyzed and found to contain, on an elemental basis, about 0.375 wt. percent platinum, about 0.1 wt. percent lead, and about 0.85 wt. percent chloride. On an atomic basis, the ratio of lead to platinum was 0.25:1.

Thereafter, the catalyst particles were subjected to a dry pre-reduction treatment by contacting them with a substantially pure hydrogen stream containing less than 20 vol. ppm. $H_2O$ at a temperature of about 1,000°F., a pressure slightly above atmospheric and a flow rate of the hydrogen stream through the catalyst particles corresponding to a gas hourly space velocity of about 720 hr.$^{-1}$. This prereduction step was for a duration of about 1 hour. A portion of the catalyst is placed, as an active catalytic composite, in a continuous-flow fixed-bed isomerization pilot plant of conventional design. This plant consists of a nominal 1 inch inside-diameter reactor wherein the catalyst is placed as a fixed bed in the latter portion of the reactor. Tabular alumina is placed above this catalyst to function as a preheat section and to insure isothermal reactor conditions within the catalyst bed. In this reactor, the hydrocarbon charge stock is commingled with hydrogen and heated to the desired isomerization reaction temperature before contacting the hydrocarbon and hydrogen mixture with the catalyst. The resultant effluent is cooled and a normally gaseous and liquid product is recovered and analyzed.

To illustrate the utility of this catalyst to isomerize $C_8$ alkylaromatics, a charge stock containing, on a weight percent basis, 20.0 percent ethylbenzene, 10.0 percent para-xylene, 50.0 percent meta-xylene, and 20.0 percent ortho-xylene is commingled with about 10 moles of hydrogen per mole of hydrocarbon, and continuously charged at 2.0 liquid hourly space velocity (LHSV) to the reactor which is maintained at a reactor pressure of about 200 psig. and a reactor temperature of about 425°C. The rsulting product evidences essentially equilibrium conversion to para-xylene with only insignificant amounts of cracked products and hydrogenated products thus indicating an efficient alkylaromatic isomerization process.

EXAMPLE II

A portion of catalyst produced as in Example I is placed in a continuous-flow fixed-bed isomerization plant as described in Example I. Substantially pure meta-xylene is used as a charge stock. This charge stock is commingled with about 10 moles of hydrogen per mole of hydrocarbon and is continuously passed at 3.0 LHSV to the reactor which is maintained at a pressure of about 300 psig. and a temperature of about 400°C. Substantial conversion of meta-xylene to para-xylene is obtained . . . i.e., greater than 80 percent of equilibrium.

EXAMPLE III

A catalyst essentially identical to that produced in Example I but containing only 0.40 wt. percent combined halogen is used to isomerize 1-butene in an appropriate pilot plant isomerization reactor, at a reactor pressure of about 500 psig. and a reactor temperature of about 130°C. Substantial conversion to 2-butene is observed.

EXAMPLE IV

The same catalyst as utilized in Example III is charged to an appropriate continuous-flow fixed-bed isomerization reactor of conventional design maintained at a reactor pressure of about 1,000 psig. and a reactor temperature of about 175°C. 3-methyl 1-butene is continuously passed to this reactor with substantial conversion to 2-methyl-2-butene being observed.

EXAMPLE V

A catalyst, identical to that of in Example I except that the gamma-alumina particles are contacted with hydrogen fluoride to provide a 2.9 wt. percent combined fluoride content in the catalyst, is placed in an appropriate continuous-flow fixed-bed isomerization reactor of conventional design. This reactor is maintained at a reactor pressure of about 500 psig. and a reactor temperature of about 200°C. Normal hexane is continuously charged to the reactor in admixture with hydrogen at a 5:1 hydrogen to hexane mole ratio. An analysis of the resultant product stream shows substantial conversion to 2,2-dimethylbutane, 2,3-dimethylbutane, 2-methylpentane and 3-methylpentane.

EXAMPLE VI

Two hundred grams of reduced platinum-lead alumina composite as produced in Example I are placed in a glass-lined rotating autoclave along with 150 grams of anhydrous aluminum chloride. The autoclave is sealed, pressured with 25 psig. of hydrogen, and heated and rotated for 2 hours at 300°C. The autoclave is then allowed to cool, depressured through a caustic scrubber, opened and the final composite removed therefrom. An analysis of the resultant composite indicates about a 15 wt. percent gain based on the original platinum-lead composite equivalent to the aluminum chloride sublimed and reacted thereon. The caustic scrubber is found to have adsorbed hydrogen chloride equivalent to about 5.0 wt. percent of the original composite corresponding to about 0.8 moles of HCl evolved per mole of aluminum chloride reacted therewith. A portion of the catalyst thus prepared is placed in an appropriate continuous-flow fixed-bed pilot plant isomerization reactor and used to isomerize normal butane. The normal butane is continuously passed to the reactor at a 1.0 liquid hourly space velocity, a 0.5 hydrogen to hydrocarbon mole ratio while the reactor is maintained at a reactor pressure of 450 psig. and a reactor temperature of 220° C. Substantial conversion of normal butane to isobutane is observed . . . i.e., approximately a conversion of normal butane to isobutane of about 45 wt. percent of the original normal butane charged to the reactor.

EXAMPLE VII

A portion of the catalyst as prepared in Example I is placed in an appropriate continuous-flow isomerization reactor maintained at a reactor temperature of about 210°C. and a reactor pressure of about 300 psig. Methylcyclopentane, in admixture with hydrogen, is continuously passed to this reactor with a substantial conversion to cyclohexane being observed.

I claim as my invention:

1. A process for isomerizing an isomerizable hydrocarbon which comprises contacting said hydrocarbon, at isomerization conditions, with a catalytic composite comprising a combination of a platinum group component and a lead component uniformly distributed throughout a porous carrier material wherein said composite contains, on an elemental basis, about 0.01 to about 2 wt. percent platinum group component and lead in an atomic ratio of lead to platinum group component of from about 0.05:1 to about 0.9:1.

2. The process of claim 1 further characterized in that said carrier material is a refractory inorganic oxide.

3. The process of claim 2 further characterized in that said refractory inorganic oxide is alumina.

4. The process of claim 1 wherein said catalytic composite has combined therewith, on an elemental basis, about 0.1 to about 5 wt. percent chlorine or fluorine.

5. The process of claim 1 wherein said catalytic composite has combined therewith a sulfur component in an amount of about 0.05 to about 0.5 wt. percent sulfur, calculated on an elemental sulfur basis.

6. The process of claim 1 further characterized in that said platinum group component is platinum, palladium, or a compound of platinum or palladium.

7. The process of claim 1 further characterized in that said isomerizable hydrocarbon is a saturated hydrocarbon and said isomerization conditions include a temperature of about 0°C. to about 500°C., a pressure of about atmospheric to about 200 atmospheres, and a liquid hourly space velocity of about 0.1 to about 10 hr.$^{-1}$ 8. The process of claim 7 further characterized in that said hydrocarbon is commingled with about 0.1 to about 10 moles of hydrogen per mole of hydrocarbon.

9. The process of claim 7 further characterized in that said saturated hydrocarbon is a paraffinic hydrocarbon.

10. The process of claim 9 further characterized in that said hydrocarbon is a $C_4$—$C_9$ alkane.

11. The process of claim 10 wherein said catalytic composite has combined therewith about 1 to about 100 wt. percent Friedel-Crafts metal halide, calculated on a Friedel-Crafts metal halide-free composite.

12. The process of claim 7 wherein said catalytic composite has combined therewith, on an elemental basis, about 0.1 to about 5.0 wt. percent chlorine or fluorine and said carrier material is alumina.

13. The process of claim 1 further characterized in that said hydrocarbon is an olefinic hydrocarbon and said isomerization conditions include a temperature of about 0°C. to about 500°C. and a pressure of about atmospheric to about 200 atmospheres.

14. The process of claim 13 further characterized in that said olefin is a $C_4$ — $C_7$ isomerizable olefin.

15. The process of claim 1 further characterized in that said isomerizable hydrocarbon is an alkylaromatic hydrocarbon and said isomerization conditions include a temperature of about 0°C. to about 600°C., a pressure of about atmospheric to about 100 atmospheres, and a liquid hourly space velocity of about 0.1 to about 20 hr.$^{-1}$ 16. The process of claim 15 further characterized in that said hydrocarbon is commingled with about 1 to about 25 moles of hydrogen per mole of hydrocarbon.

17. The process of claim 15 wherein said catalytic composite has combined therewith about 0.1 to about 5 wt. percent chlorine or fluorine, on an elemental basis, and said carrier material is alumina.

18. The process of claim 15 further characterized in that said hydrocarbon is a $C_8$ alkylaromatic or a non-equilibrium mixture of $C_8$ alkylaromatics.

* * * * *